(12) United States Patent
Hopkins et al.

(10) Patent No.: US 8,304,590 B2
(45) Date of Patent: Nov. 6, 2012

(54) AUTOTHERMAL AND MOBILE TORREFACTION DEVICES

(75) Inventors: Christopher B. Hopkins, Durham, NC (US); Rucker Preston Burnette, Jr., Tampa, FL (US)

(73) Assignee: NOrth Carolina State University, Raleigh, NC (US)

( * ) Notice: Subject to any disclaimer, the term of this patent is extended or adjusted under 35 U.S.C. 154(b) by 780 days.

(21) Appl. No.: 12/418,381

(22) Filed: Apr. 3, 2009

(65) Prior Publication Data

US 2009/0250331 A1 Oct. 8, 2009

Related U.S. Application Data

(60) Provisional application No. 61/042,034, filed on Apr. 3, 2008.

(51) Int. Cl.
  *C10B 57/04* (2006.01)
  *C10L 5/00* (2006.01)
  *B01D 3/00* (2006.01)
(52) U.S. Cl. ............ 585/240; 201/25; 44/606; 202/118; 202/117; 202/262; 202/235
(58) Field of Classification Search ............... 201/25; 44/606; 202/117, 118, 262, 265; 585/240
  See application file for complete search history.

(56) References Cited

U.S. PATENT DOCUMENTS

| | | | |
|---|---|---|---|
| 4,361,100 A | 11/1982 | Hinger | |
| 4,553,978 A | 11/1985 | Yvan | |
| 4,787,917 A | 11/1988 | Leclerc de Bussy | |
| 4,908,104 A * | 3/1990 | Loomans et al. | 201/25 |
| 5,017,269 A * | 5/1991 | Loomans et al. | 201/25 |
| 5,110,785 A * | 5/1992 | Reed et al. | 502/404 |
| 7,749,359 B2 * | 7/2010 | Flottvik | 202/118 |
| 2003/0221363 A1* | 12/2003 | Reed | 44/594 |
| 2007/0209923 A1 | 9/2007 | Flottvik | |
| 2007/0266623 A1 | 11/2007 | Paoluccio | |
| 2008/0022595 A1 | 1/2008 | Lemaire et al. | |

(Continued)

FOREIGN PATENT DOCUMENTS

EP 0 891 799 A1 1/1999

(Continued)

OTHER PUBLICATIONS

Bergman, P. C. A. et al., *Torrefaction for Biomass Upgrading*, 14$^{th}$ European Biomass Conference, Oct. 17-21, 2005, Paris, France, pp. 206-209.

(Continued)

*Primary Examiner* — Nina Bhat
(74) *Attorney, Agent, or Firm* — Alston & Bird LLP

(57) ABSTRACT

Autothermal torrefaction devices, which can be either stationary of mobile, are provided and include a torrefaction chamber having a chamber inlet for receiving biomass and at least one chamber outlet. The torrefaction chamber can be substantially surrounded by an exterior housing defining an outer jacket and having a jacket inlet and a jacket outlet. The outer jacket and torrefaction chamber define a space therebetween such that a burner unit including an inlet operatively connected to the chamber outlet and an outlet operatively connected to the jacket inlet allows vapors produced or released from within the torrefaction chamber to travel into the burner unit for combustion of at least a portion of the vapors and subsequently travel through the space between the jacket and the torrefaction chamber to provide heat necessary for autothermal torrefaction of biomass.

31 Claims, 4 Drawing Sheets

U.S. PATENT DOCUMENTS

2008/0223269 A1    9/2008  Paoluccio
2009/0007484 A1*   1/2009  Smith .......................... 44/606

FOREIGN PATENT DOCUMENTS

| EP | 1 688 475 A1 | 8/2006 |
|----|--------------|--------|
| WO | WO 2005/056723 A1 | 6/2005 |
| WO | WO 2007/078199 A1 | 7/2007 |

OTHER PUBLICATIONS

Nasrin, A. B. et al., *Blending of Palm Biomass and Coal: An Alternative Fuel for Power Generation in Malaysia*, Oil Palm Industry Economic Journal, vol. 6(2), 2006, pp. 31-36.

International Search Report and Written Opinion for International Application No. PCT/US2009/039541 mailed Mar. 1, 2010.

Bourgois et al., "Characterization and analysis of torrefied wood", *Wood Science and Technology*, 22, (1988) pp. 143-155.

Fowles, Malcolm, "Black carbon sequestration as an alternative to bioenergy", 31, (2007) pp. 426-432.

Lehmann, Johannes, "Commentary: A handful of carbon", *Nature*, vol. 447, May 10, 2007, pp. 143-144.

Lehmann, Johannes, "Black is the new green", *Nature*, vol. 442, Aug. 10, 2006, pp. 624-626.

Arcate, James R., "Global Markets and Technologies for Torrefied Wood in 2002", *Fuels Torrefaction, Wood Energy*, No. 6, Jul. 2002, pp. 26-28.

Zwart et al., "The Impact of Biomass Pretreatment on the Feasibility of Overseas Biomass Conversion to Fischer-Tropsch Products", *Energy & Fuels*, 20, (2006), pp. 2192-2197.

* cited by examiner

AUTOTHERMAL AND MOBILE TORREFACTION DEVICES

CROSS-REFERENCE TO RELATED APPLICATIONS

This application claims the benefit of U.S. Provisional Application No. 61/042,034, filed Apr. 3, 2008, which is incorporated by reference in its entirety.

BACKGROUND OF THE INVENTION

1. Field of the Invention

The present invention relates generally to an autothermal torrefaction device that is largely self-heated, mobile or stationary, and a process for the torrefaction of biomass.

2. Description of Related Art

Torrefaction is considered to be a pre-treatment technology to make biomass more suitable for co-firing with coal applications. Torrefaction is a thermal process operated between 200° C. and 300° C. in the absence of oxygen and characterized by residence times typically around 1 hour or greater. Torrefaction processes are usually carried out at near atmospheric pressures. Torrefied biomass exhibits increased brittleness, improved grindability which may enable increased co-firing rates in the future.

During the torrefaction of biomass, the biomass partially decomposes and gives off various gases and water vapor, which results in a loss of mass and chemical energy into the gas phase. However, it is well recognized that more mass than energy is lost to the gas phase during torrefaction. This phenomenon results in energy densification. Thus, torrefaction of biomass yields a solid product with lower moisture content and a higher energy content compared to the material in the initial biomass. Specifically, torrefied biomass exhibits numerous desirable properties such as having decreased moisture content, increased calorific values, and a hydrophobic nature. As such, torrefaction has been identified as a feasible approach for improving the properties of biomass such that it is more suitable as a fuel.

However, traditional approaches lack the efficiency to provide a cost effective means for torrefaction of biomass. This inefficiency has hindered the potential commercial applications of the torrefaction of biomass. Previous torrefaction devices have been stationary and dependent upon significant amounts of supplemental heat from external sources, such as power stations, to produce a torrefied biomass. As such, traditional torrefaction devices are not largely self-sufficient in terms of heat energy used for torrefaction.

Another challenge faced by would-be harvesters and sellers of cellulosic biomass, like wood chips, is its low physical and energy density and low value, which makes it economically disadvantageous to ship it more than 30 to 50 miles to a user. Simply stated, previous devices and methods require hauling untreated biomass, which can often include as much as 50% water by weight, from several separate locations to the user's site, where the torrefaction process would take place.

Therefore, there remains a need for a more efficient torrefaction device and process for pre-treating biomass for various users and applications. Further, a need remains for a viable torrefaction device that is mobile and/or modular so that it can be field portable and self-heated to reduce the transportation costs for fuel production and eliminate such costs for carbon sequestration and soil amendment.

BRIEF SUMMARY OF THE INVENTION

The present invention satisfies at least some of the aforementioned needs by providing an autothermal torrefaction device. In certain embodiments, the present invention satisfies at least some of the aforementioned needs by providing a mobile autothermal torrefaction device, along with options to further modify the treated biomass, at its source of harvest, into pellets and other useful forms. In other embodiments, the autothermal torrefaction device is stationary. Embodiments of the present invention include a torrefaction chamber having a chamber inlet for receiving biomass and at least one chamber outlet. The torrefaction chamber can be substantially surrounded by an exterior housing defining an outer jacket and having a jacket inlet and a jacket outlet. The outer jacket and torrefaction chamber define a space therebetween such that a burner unit including an inlet operatively connected to the chamber outlet and an outlet operatively connected to the jacket inlet allows vapors produced or released from within the torrefaction chamber to travel into the burner unit for combustion of at least a portion of the vapors and subsequently travel through the space between the jacket and the torrefaction chamber to provide heat necessary for autothermal torrefaction of biomass. As such, aside from fuel to pre-heat the device and a pilot light to ensure that the biomass derived gases ignite, all the heat energy used for torrefaction will come from the biomass itself.

In another aspect, the present invention provides a process for autothermal torrefaction of biomass. Embodiments of the present invention include indirectly heating biomass through the walls of a torrefaction chamber to a temperature sufficient to produce torrefied biomass. Biomass-derived gases produced or released from within the torrefaction chamber are transferred into a burner unit and at least a portion of the biomass derived vapors are combusted. The fluegas from the burner travels through a space located between the torrefaction chamber and an exterior housing substantially surrounding the torrefaction chamber. The vapors exiting the burner provide the heat necessary for autothermal torrefaction of biomass within the torrefaction chamber. Accordingly, aside from fuel to pre-heat the device and a pilot light to ensure that the biomass derived gases ignite, all the heat energy used for torrefaction will come from the biomass itself.

Additionally, the present invention provides methods for increasing the cost effectiveness of using torrefied biomass as a fuel. Embodiments of the present invention include providing at least one autothermal torrefaction device at a point of operation, such as a point of harvest, which may include but is not limited to, farms and forests in a location remote from a power plant, charging biomass located at the point of operation into the autothermal torrefaction device, and converting the biomass located at the point of operation into torrefied biomass. As such, the costs, per BTU, of shipping the feedstocks are greatly reduced, since the cost of transporting water in the untreated biomass is substantially eliminated and the fuel in now more energy dense.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
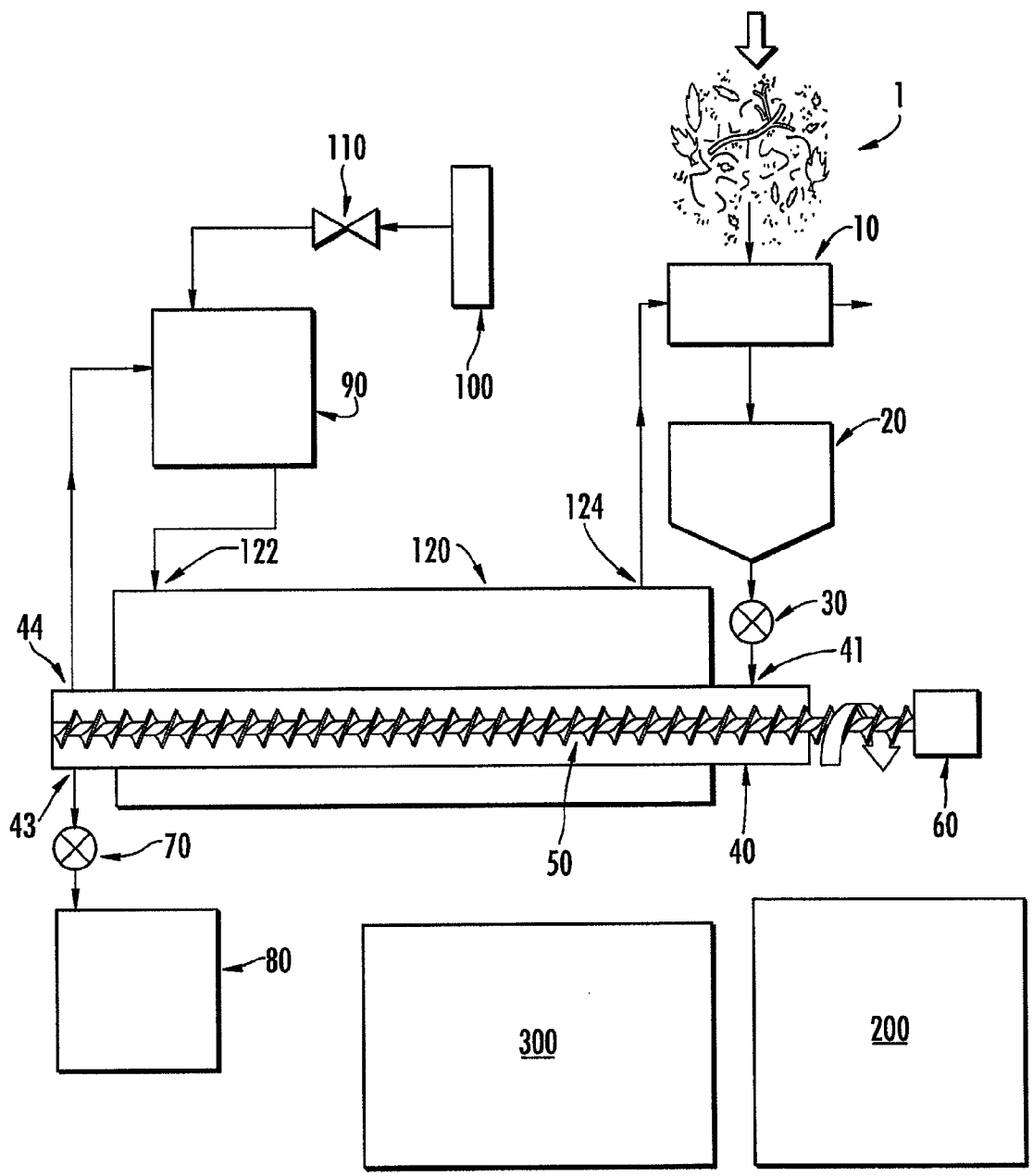
FIG. 1 depicts an autothermal torrefaction device having a countercurrent flow and a biomass pre-heater.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Biomass can be transformed by heat in a low oxygen environment into a hydrophobic, decay resistant material that can be used as a coal fuel substitute or biomass fuel additive. Torrefied biomass is also known as bio-char and is being investigated as both a permanent carbon sequestration material in soil as well as a soil amendment that can increase plant growth rates. Torrefied biomass can also be used as a feedstock for further biomass gasification and a feedstock for liquid fuel substitutes. Additionally, torrefied biomass can be used for fuel, fertilizer, and long-term carbon storage.

Of particular significance, torrefied biomass used in existing coal plants can satisfy the need of using renewable fuels with existing infrastructure to generate electricity. Further, torrefied biomass has the added benefit of providing this energy in a carbon neutral way because is does not add carbon to the biosphere. Likewise, torrefied biomass used in a bio-char application can remove carbon from the atmosphere for several hundred to several thousand years.

It should be understood that the term biomass, as used herein, is a general term, which includes all organic matter (e.g., all matter that originates from photosynthesis). Often, biomass is a heterogeneous feedstock, whose composition may vary depending on origin, physical location, age, and season among other factors. In various embodiments, biomass types can include numerous types of wood, plants, vegetable oils, green waste, and even manure and sewer sludge.

According to embodiments of the present invention, an autothermal torrefaction device converts various forms of biomass into a partly pyrolized and torrefied biomass that can be appropriate for use as a carbon neutral fuel, for use as a coal substitute in existing coal-fired boilers, for further treatment through gasification, and also for carbon sequestration and soil amendment. In one embodiment, the autothermal torrefaction device can be charged, continuously or batch-wise, with fresh biomass including a moisture content up to about 55% by weight. Alternatively, the biomass can be pre-dried and/or pre-heated prior to being charged into a torrefaction chamber. In certain embodiments, the fresh biomass charged into the torrefaction device is free from non-biomass additives, such as plastic materials.

In one embodiment, an autothermal torrefaction device, which can be mobile and/or modular, or stationary, includes a torrefaction chamber having a chamber inlet for receiving biomass and at least one chamber outlet. The torrefaction chamber can be substantially surrounded by an exterior housing defining an outer jacket and having a jacket inlet and a jacket outlet. The outer jacket and torrefaction chamber define a space therebetween such that a burner unit including an inlet operatively connected to the chamber outlet and an outlet operatively connected to the jacket inlet allows vapors produced or released from within the torrefaction chamber to travel into the burner unit for combustion of at least a portion of the vapors and subsequently travel through the space between the jacket and the torrefaction chamber to provide heat necessary for autothermal torrefaction of biomass. In such embodiments, combustion/flue-gases from the burner indirectly heat the biomass through the walls of the torrefaction chamber. As the biomass moves through the torrefaction chamber, the biomass can produce water vapor, volatile organic compounds, pyrolysis gases and vapor phase tars. In one embodiment, these vapors move to the burner under their own pressure in conjunction with a natural chimney draft. The combustible gases produced and/or released in the torrefaction chamber are at least partially combusted in the burner to generate process heat for further biomass torrefaction in conjunction with the heat available from any steam driven from the biomass in the torrefaction chamber. In one embodiment, all of the combustible vapors released from the torrefaction chamber are combusted in the burner.

In certain embodiments, there is no need to segregate the water vapor from the other gases emitted by the biomass, where the biomass can have a moisture content as high as about 55% by wt., or about 50% by wt., or about 45% by wt., or about 40% by wt., or about 35% by wt., or about 30% by wt., or about 20% by wt., or about 15% by wt., or about 10% by wt., or 5% by wt. Beneficially, both the steam and combustible gases derived from the biomass are directed into the burner. The heat available from both the steam and combustion gases is utilized to provide heat for the torrefaction of biomass. For instance, this heat is passed through a jacket surrounding the torrefaction chamber such that the biomass is indirectly heated by the steam and combustion gases through the walls of the torrefaction chamber. Thus, apart from fuel to pre-heat the device and a pilot light for the burner to ensure ignition of the gases, all the heat energy used for the torrefaction of biomass will come from biomass itself.

In preferred embodiments, the burner or combustion box is designed in such a way that the gases are fully oxidized before they reach the outer jacket. This allows all the energy to be extracted from the gases giving the maximum amount of heat available to the torrefaction chambers. In particular, the distance between the burner and the outer jacket should be no less then about 7 feet, or no less than about 9 feet, or no less than about 12 feet. Such a distance ensures that gases are fully oxidized prior to coming into contact with the outside of the torrefaction chambers. Beneficially, such a design also protects the torrefaction chambers from corrosive gases. As such, these embodiments allow the use of mild steel instead of refractory steels. Accordingly, these embodiments allow financial savings and allow better heat transfer into the biomass conveyed inside the chambers.

In other embodiments, the torrefaction chamber is designed such that sufficient heat transfer area is available to transfer heat from the combustion/flue-gases and steam to raise the gases surrounding the biomass to a temperature between about 300° C. to about 500° C. for approximately 5 minutes. In various embodiments, the gases surrounding the biomass can be heated to between about 310° C. to about 390° C., or about 320° C. to about 380° C., or about 330° C. to about 370° C., or about 340° C. to about 360° C. Thus, in certain embodiments, the environment surrounding the biomass during torrefaction is at least about 300° C., often at least about 320° C., and typically at least about 340° C. In certain embodiments, the torrefaction chamber is designed such that sufficient heat transfer area is available to transfer heat from the combustion/flue-gases and steam to raise the gases surrounding the biomass to any of the previously mentioned temperature ranges for about 2 to about 16 minutes, or about 3 to about 15 minutes, or about 4 to about 12 minutes, or about 5 to about 10 minutes. In a variety of embodiments, the temperature of the vapors within the torrefaction chamber can increase in temperature from near ambient temperature proximate to the torrefaction chamber inlet to within any of the aforementioned temperature ranges proximate to the torrefaction chamber outlet. According to various embodiments, the residence time of the biomass within the torrefaction chamber can range from about 2 to about 16 minutes, or about 3 to about 15 minutes, or about 4 to about 12 minutes, or about 5 to about 10 minutes. In certain embodiments, the residence time of the biomass is no more than about 10 minutes, often no more than about 8 minutes, and frequently no more than about 6 minutes or no more than about 5 minutes. In additional embodiments, the gases surrounding the biomass can be raised to any of the previously mentioned temperature ranges for about 2 to about 9 minutes, or about 2 to about 8 minutes, or about 2 to about 7 minutes, or about 3 to about 8 minutes, or about 5 to about 7 minutes. In a variety of embodiments, the temperature of the vapors within the torrefaction chamber can increase in temperature from near ambient temperature proximate to the torrefaction chamber inlet to within any of the aforementioned temperature ranges proximate to the torrefaction chamber outlet. According to various embodiments, the residence time of the biomass within the torrefaction chamber can range from about 2 to about 9 minutes, or about 2 to about 8 minutes, or about 2 to about 7 minutes, or about 3 to about 8 minutes, or about 5 to 7 minutes.

In addition to the indirect transfer of heat from the combustion gases and steam to the biomass according to such embodiments, the biomass itself can begin to release heat when it reaches temperatures above about 300° C. Since biomass is typically heterogeneous in particle size, the smaller particles in this process are more thoroughly pyrolized by both receiving heat from the torrefaction walls more effectively by virtue of their larger surface area to volume ratio and giving up hot gases as they reach temperatures above about 300° C. When handling biomass, such as various wood and plants for example, a portion of the material will chip or break into significantly smaller pieces. For example, such smaller pieces can include woodchips, sawdust, leaves and bark. The heat from the walls of the torrefaction chamber and the heat of gases from small biomass particles allow the larger pieces of biomass to reach the key torrefaction temperature of about 270° C. As such, the smaller sized pieces, upon being indirectly heated by the flue-gases, provide some of the energy used for the torrefaction of the larger biomass pieces.

FIG. 1 illustrates an autothermal torrefaction device according to one embodiment of the present invention. In this particular embodiment, wet or fresh biomass 1 from a source is at least partially pre-dried and pre-heated by a direct or indirect heat exchanger 10 prior to being charged into a feed hopper 20 by utilizing the waste heat from the torrefaction device. Such embodiments, therefore, beneficially do not require a separate dying system for pre-drying or pre-heating the biomass. An air-lock valve 30 is located at the discharge of the feed hopper for controlling or metering the biomass into a torrefaction chamber 40 via a chamber inlet 41. In this embodiment, the biomass is conveyed through the torrefaction chamber by a material handling device 50 (e.g., screw conveyer) for transporting biomass from the chamber inlet 41 to chamber outlet 43. The material handling device is driven by a motor 60. In one preferred embodiment, the autothermal torrefaction device is modular and field operable. In such cases, the energy for driving the motor can be provided by a generator 300. The torrefaction chamber includes a chamber inlet for receiving biomass and at least one chamber outlet.

FIG. 1 illustrates a torrefaction chamber having two chamber outlets. A first chamber outlet 43 is provided near the bottom of the torrefaction chamber so that torrefied biomass can exit the chamber by dropping out the bottom of the chamber. If desired, the exiting torrefied biomass can be dropped into an intermediate holding or surge tank (not shown). Regardless, the biomass exiting the torrefaction chamber can be metered by an air-lock valve 70 into a transportable holding tank 80. This holding tank 80 can be transported to an existing coal-fired power station for co-firing applications. The second torrefaction chamber outlet 44 can be positioned near the top of the chamber to enable the biomass-derived gases produced or released within the torrefaction chamber to travel to a burner 90. The vapors, including steam released from the biomass, travel into the burner where at least a portion of the combustible vapors are combusted. After combustion, the vapors, including any steam released or driven off from the biomass in the torrefaction chamber, travel through a space between and defined by an exterior housing defining an outer jacket 120, which substantially surrounds the torrefaction chamber 40. The outer jacket includes a jacket inlet 122 and a jacket outlet 124 such that vapors exiting the burner travel into the jacket via the jacket inlet, through the space between the jacket and the torrefaction chamber, and out the jacket outlet. In one preferred embodiment, the vapors exiting the outer jacket are passed through a heat exchanger 10 where remaining heat contained in these vapors is utilized in pre-heating and/or pre-drying fresh biomass 1. Beneficially, the biomass-derived vapors, including any steam released from the biomass, produced or released from within the torrefaction chamber ultimately provide the heat necessary for autothermal torrefaction of biomass. Accordingly, such embodiments are desirably self-sufficient in terms of heat, wherein external heat sources are needed only for start-up and to maintain a pilot light in the burner. For such instances, a portable gas tank 100 (e.g., cylinder of propane) can easily be used in mobile and/or modular embodiments. When the gas is not needed, a valve 110 can be closed.

While an external heating source, such as a source of combustible gas, can be used for purposes of warming the torrefaction device to the desired operating temperature, once the desired temperature is reached, the energy input from external heating sources is greatly reduced according to the present invention. For example, during start-up, the energy input to the torrefaction device could be as high as about 650,000 BTU/hr. However, once initial torrefaction temperatures are reached, the energy input to the system from an external source (i.e., energy not derived from combustion of gases produced by the torrefaction process) can be dropped to no more than about 50,000 BTU/hr, often no more than about 40,000 BTU/hr, and typically no more than about 30,000 BTU/hr.

In preferred embodiments, the hopper 20 acts as a steam lock. More specifically, the water in the biomass and the water created from de-hydrogenation reactions expands when exposed to heat and turns to steam within the torrefaction chamber 40. This steam fills the torrefaction chamber and travels not only out the exit of the torrefaction chamber to the burner, but a portion can also escape out of the torrefaction chamber inlet and travel through the hopper. That is, a positive flow of steam travels out of chamber and into hopper (and burner). This positive flow of steam traveling though the hopper prevents air, and thus oxygen, from entering the torrefaction chamber through the hopper. Accordingly, the chamber is essentially locked to the entrance of ambient air (especially oxygen). Beneficially, such embodiments do not require an air lock valve on the feed hopper or a nitrogen purge.

Although FIG. 1 illustrates an embodiment having a screw conveyor as the material handling device 50, the material handling device is not limited to only screw conveyors. For instance, certain embodiments of the present invention can include any material handling device(s) that mechanically and continuously conveys the biomass internally through the torrefaction chamber(s) from an inlet to an outlet such that continuous operation of the device is possible. Preferably, the material handling device is adapted to promote an increased rate of internal tumbling or "turn-over" of the biomass. That is, the material handling device is preferably configured and operated such that the biomass being conveyed through the torrefaction chamber is subjected to increased and continuous internal turbulence or tumbling. This high level of tumbling or mixing action within the torrefaction chamber helps promote continuous turn-over of biomass coming into contact with the hot walls of the torrefaction chamber. As such, more of the biomass being transported through the torrefaction chamber is placed into intimate contact with the hot walls of the torrefaction chamber per unit time. A material handling device adapted to promote this high level of internal tumbling, beneficially, can increase the rate at which heat is transferred into the biomass and facilitate the efficient torrefaction of biomass as evident at least in part by the reduced residence times achieved by embodiments described herein. In addition to a screw conveyor or auger system for the promotion of increased internal tumbling, the material handling device can also be, for example, a reciprocating chain drive, a conveying chain, a drag chain, or the like.

In one preferred embodiment, the flow of vapors produced or released from within the torrefaction chamber travel in a first direction, namely in a direction from the chamber inlet to chamber outlet, to the burner unit and the flue-gas exiting the burner travel in a second direction being opposite of the first direction. As such, the combustion/flue-gases and/or steam travel in a countercurrent flow to the vapors emitted in the torrefaction chamber. FIG. 1, depicts such an embodiment having a countercurrent flow scheme. In one alternative embodiment, the torrefaction device of comprises a co-current flow scheme. In particular, the vapors produced or released from within the torrefaction chamber travel in the same direction as the vapors traveling through the space between the jacket and the torrefaction chamber. In this embodiment, the combusted vapors from the burner travel through the jacket in a manner in which the combusted vapors enter the jacket at a point closest to the torrefaction chamber inlet and exit the outer jacket at a position closest to the torrefaction chamber outlet. In yet another alternative embodiment, the torrefaction device of comprises a cross flow scheme. In particular, the direction of the combusted gases and/or steam travels perpendicular to the torrefaction chamber.

According to certain embodiments of the present invention, the torrefaction device can, if desired, include an integral cooling system. Alternatively, the torrefaction device can be directly or indirectly operatively connected to a cooling system for the torrefied material. Such embodiments are preferably utilized when the hot torrefied biomass will not be subjected to pelletizing, briquetting, or otherwise densified while hot. In instances in which the torrefied biomass will not be densified while still hot, cooling of the torrefied wood is important to prevent fires. As such, heat must be taken out of the torrefied biomass before it reaches atmospheric air or the torrefied biomass will react with the oxygen. In such cases, the temperature of the torrefied biomass should be cooled to no more than about 150° F., 130° F., 115° F., or 100° F. (i.e., cool to 100° F. or lower). In certain embodiments, air cooled heat exchangers, water cooled heat exchangers, or both can be used to remove heat from the torrefied biomass. In preferred embodiments, the biomass is conveyed through the cooler(s) by means of a material handling device similar to that used in the torrefaction chambers. In more preferred embodiments, heat released from the torrefied material may be used for direct or indirect drying of biomass, heating combustion air or released to the environment.

Figure 2:
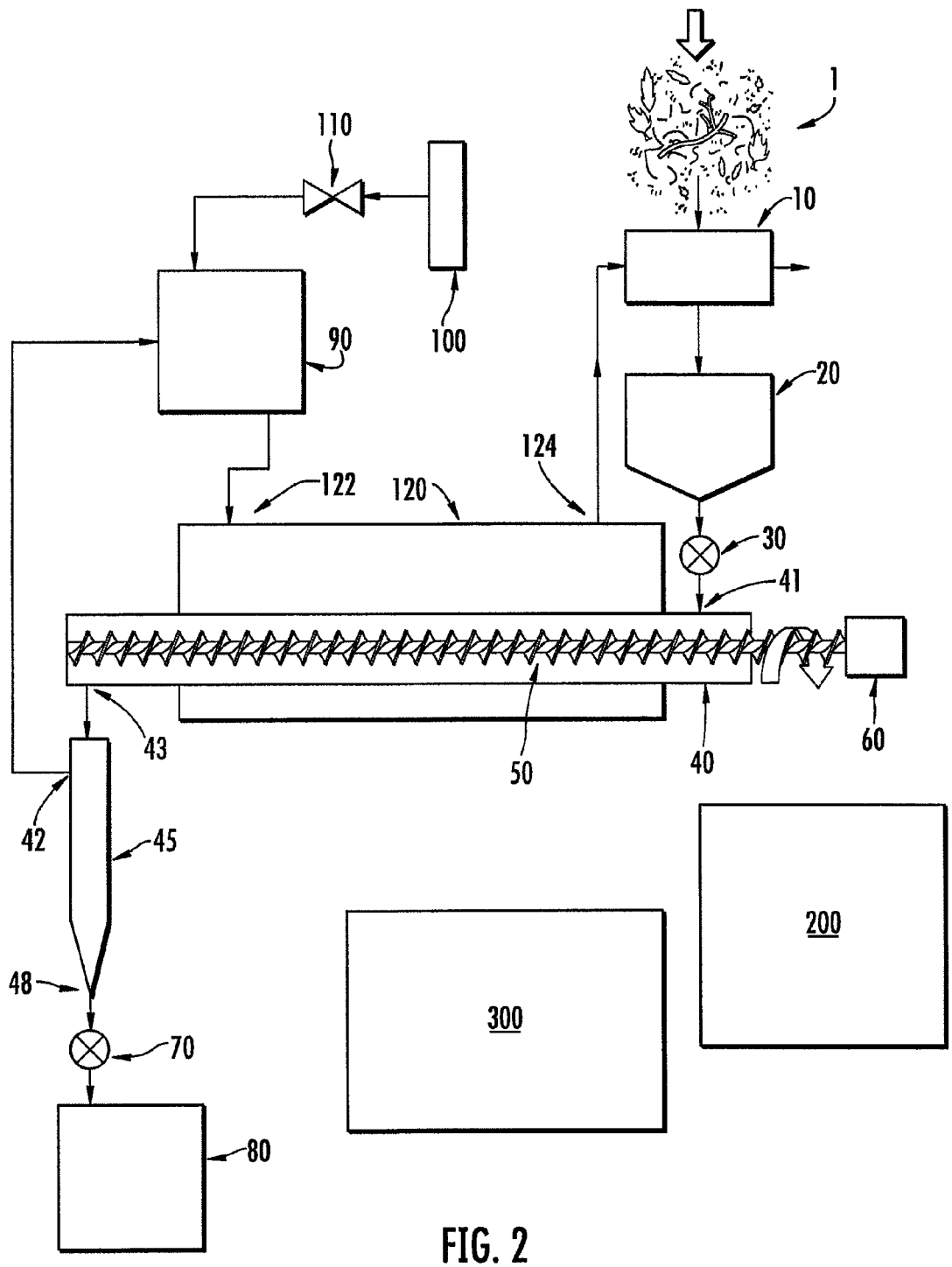
FIG. 2 depicts an autothermal torrefaction device having a single torrefaction chamber outlet.

FIG. 2 illustrates an autothermal torrefaction device according to yet another embodiment of the present invention. In this particular embodiment, the torrefaction chamber 40 includes a single torrefaction chamber outlet 43 located near the bottom of the chamber. Accordingly, both the torrefied biomass and the biomass-derived vapors generated within the torrefaction chamber exit through the same chamber outlet 43. As shown in FIG. 2, a gas-solid separator 45 (e.g., cyclone) can be utilized to ensure that torrefied biomass is not inadvertently entrained in vapors drawn into the burner 90 for combustion. The torrefied, biomass and biomass-derived vapors enter the gas-solid separator 45 while the torrefied biomass falls to the bottom section of the separator 48 for discharge and the vapors are exit via the top section of the separator 42. The biomass-derived vapors travel to the burner for combustion, while the torrefied biomass is metered into a transportable container 80 via an air-lock valve 70.

According to certain embodiments of the present invention, an autothermal torrefaction device can comprise more than one torrefaction chamber. Thus, despite FIGS. 1 and 2 illustrating embodiments having only one torrefaction chamber 40 within an outer housing/jacket 120, many embodiments of the present invention can comprise more than one torrefaction chamber. For instance, a single torrefaction device can comprise more than about 20 torrefaction chambers, or alternatively from 2 to about 20 chambers. In one embodiment, the torrefaction device comprises from 2 to about 10 torrefaction chambers, preferably from about 4 to about 8 chambers. In one preferred embodiment, the torrefaction device includes about 6 torrefaction chambers located within the exterior housing or jacket. In another embodiment, the device comprises from about 5 to about 18 chambers, preferably from about 10 to about 14 chambers. In one such embodiment, the device comprises about 12 torrefaction chambers disposed within the outer jacket. In yet another embodiment, the torrefaction chamber comprises from about 10 to about 20 torrefaction chambers, preferably about 12 to about 18, more preferably from about 14 to about 16 torrefaction chambers located within a single outer jacket. In various embodiments, separate material handling devices (e.g., separate auger or screw conveyor systems) can be included for conveying biomass through the respective chambers.

Figure 3:
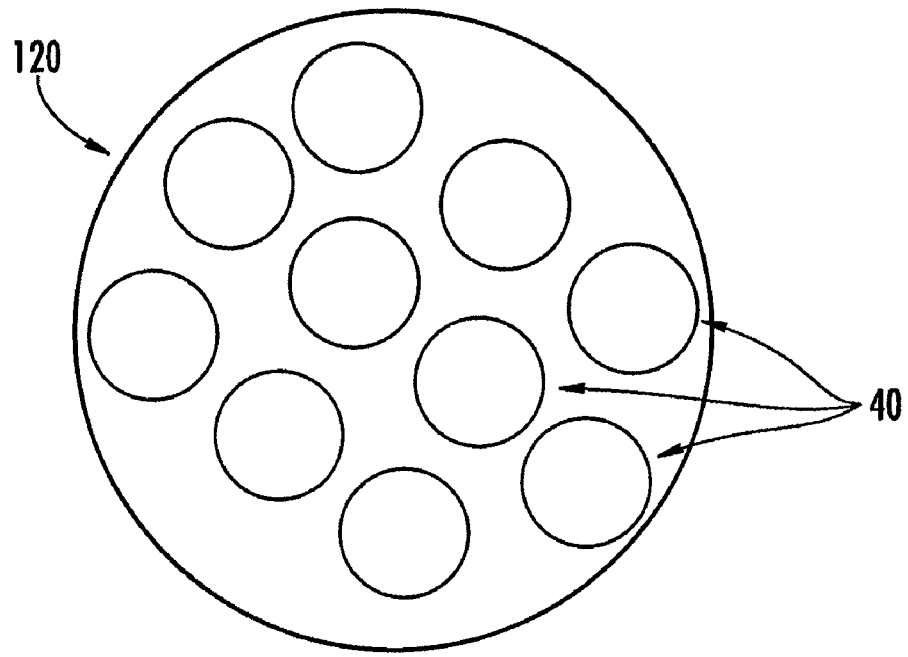
FIG. 3 depicts a cross sectional view of one embodiment having multiple torrefaction chambers.
Figure 4:
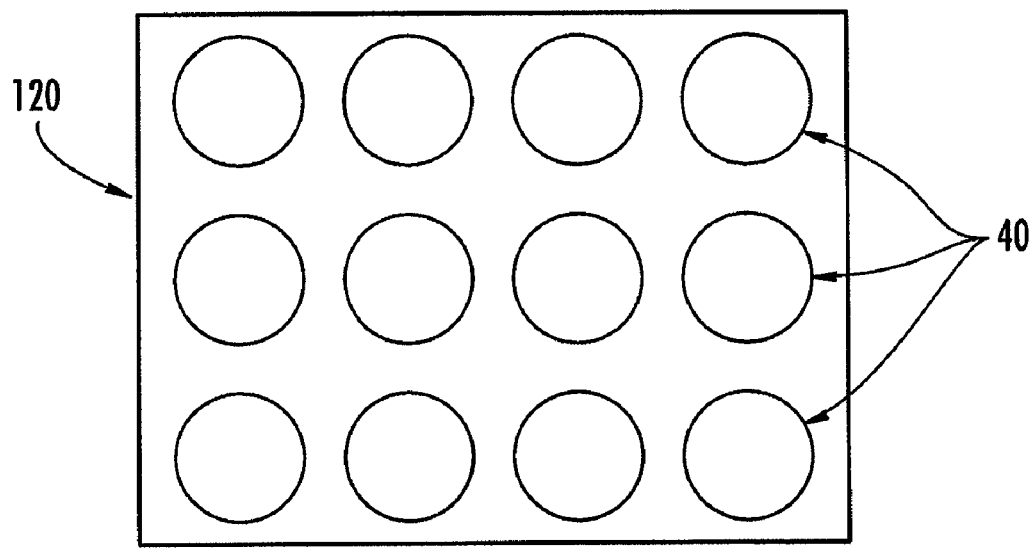
FIG. 4 depicts a cross-sectional view of another embodiment having multiple torrefaction chambers.

FIGS. 3 and 4 illustrate cross-sectional views of various embodiments having more than one torrefaction chamber. In particular, FIG. 3 depicts an embodiment having a circular outer jacket 120 and ten torrefaction chambers 40. FIG. 4 depicts an embodiment having twelve torrefaction chambers 40 located within a rectangular outer jacket 120.

According to certain embodiments comprising multiple torrefaction chambers, wet or fresh biomass can optionally be at least partially pre-dried and pre-heated by a direct or indirect heat exchanger prior to being charged into a feed hopper or hoppers. An air-lock valve(s) located at the discharge of the feed hopper(s) for controlling or metering the biomass into respective torrefaction chambers via a chamber inlet of each chamber. In such embodiments, the biomass is conveyed through the torrefaction chambers by their respective material handling device for transporting biomass from the chamber inlet to chamber outlet.

In one preferred embodiment, the autothermal torrefaction device is modular and/or mobile. Thus, according to one preferred embodiment, the device is not only field operable, but can be easily relocated to other locations. In such cases, the energy for driving the motor(s) can be provided by a generator.

FIGS. 1 and 2 both illustrate embodiments of the present invention including an optional control device 200, which can be used to monitor and adjust process conditions. In some embodiments, the control device 200 can include various hardware and/or software. The control device can be connected to one or more sensors (not shown) or meters either indirectly, such as wirelessly connected, or directly. One such example of a control device comprises a programmable logic controller (PLC). Preferably, the control device comprises PLC due to its design for multiple input and output arrangements (not shown), extended temperature ranges, immunity to electrical noise, and resistance to vibration and impact. These extensive input/output (I/O) arrangements can connect the PLC to a multitude of sensors, drives, gauges, and actuators (none shown). Such a control device 200 can also read limit switches, analog process variables (such as temperature and pressure), and the positions of complex positioning systems. For example, on the actuator side, the control device 200 can operate electric motors, pneumatic or hydraulic cylinders, magnetic relays or solenoids, or analog outputs. The input/output arrangements of the control device may be built into a simple PLC, or the PLC may have external I/O modules attached to a computer network that plugs into the PLC.

In certain embodiments, the control device can be connected to one or more process sensors and/or controls. For instance the control device can be connected to a plurality of temperature sensors, load cells, variable frequency drives, pressure sensors, gas flow rate sensors and one or more human-machine interfaces. For instance, various embodiments can include temperature gauges/sensors (not shown) throughout the torrefaction chamber, inside the burner unit, throughout the jacket surrounding the torrefaction chamber or at the exhaust outlet. Such embodiments can, if desired, also include load cells (not shown) which may be provided to monitor the weight of biomass in tanks 20 and 80. Embodiments of the present invention can also include one or more pressure gauges/sensors (not shown). For example, temperature sensors can be provided to monitor the temperature within the torrefaction chamber, within the jacket, or even within the burner unit. Similarly, the control device can also be connected to gas flow rate sensor to monitor the rate of gas exiting as exhaust. Additionally, the control device can also be connected to one or more variable frequency drives, wherein the amperage of the motor can be monitored and adjusted as needed. For instance, motor 60 can comprise a variable frequency drive. Likewise, air-lock/metering valves 30 and 70 can also be driven by respective variable frequency drives (not shown). In one preferred embodiment, the control device includes at least one human-machine interface, wherein an operator can monitor the various process parameters and if needed manually adjust process parameters either in the field or via the human-interface machine. Preferably, the control device 200 is a PLC, wherein the various process parameters can be assigned pre-determined set-points and the various process sensors, actuators and/or drives are automatically adjusted by the PLC based on the real time outputs received from these process control devices.

In one preferred embodiment, the torrefaction chamber comprises a circular conduit. Further, the space between and defined by the outer jacket and torrefaction chamber can comprise an annulus. In other embodiments, the torrefaction chamber comprises a circular conduit and the jacket surrounding the torrefaction chamber can comprise a rectangular box or any other geometrical configuration desired. In certain embodiments, especially mobile and/or modular embodiments, the autothermal torrefaction device can include at least one pellet or briquette mill or the like operatively connected to the chamber outlet such that torrefied biomass exiting the torrefaction chamber is palletized, briquetted, or otherwise densified. Thus, the torrefied biomass can be pelletized in the field while the torrefied biomass is still hot. Alternatively, the hot exiting torrefied biomass can be manually charged to a separate pelletizing or briquetting unit positioned proximately thereto, such as in the same field, farm or forest.

The torrefaction chamber can be substantially surrounded by an exterior housing defining an outer jacket and having a jacket inlet and a jacket outlet. The outer jacket and torrefaction chamber define a space therebetween such that a burner unit including an inlet operatively connected to the chamber outlet and an outlet operatively connected to the jacket inlet allows vapors produced or released from within the torrefaction chamber to travel into the burner unit for combustion of at least a portion of the vapors and subsequently travel through the space between the jacket and the torrefaction chamber to provide heat necessary for autothermal torrefaction of biomass. As such, aside from fuel to pre-heat the device and a pilot light to ensure that the biomass derived gases ignite, all the heat energy used for torrefaction will come from the biomass itself.

In one embodiment, the torrefaction device can comprise one or more torrefaction chambers; wherein each torrefaction chamber has an internal diameter from about three inches to about 15 inches. In other embodiments, the internal diameter of each chamber can comprise from about four inches to about twelve inches, or from about five inches to about nine inches. For example, in one particular embodiment each chamber comprises an internal diameter of about six inches. In another embodiment, the internal diameter of the torrefaction chamber(s) comprises from about 10 inches to about 40 inches, or 20 inches to 30 inches. In alternative embodiments, the device can comprise multiple torrefaction chambers; wherein the internal diameters of the chambers are not identical.

In certain embodiments, the length of the torrefaction chamber(s) which is surrounded by the outer jacket can comprise from about 5 to about 50 feet. In certain embodiments, the length of the torrefaction chamber(s), which is surrounded by the outer jacket can comprise from about 5 to about 20 feet, preferably from about 10 to about 18 feet, more preferably from about 13 to 17 feet. In other embodiments, the length of the torrefaction chamber(s), which is surrounded by the outer jacket can comprise from about 20 to about 50 feet, preferably from about 30 to about 45 feet, more preferably from about 35 to 40 feet. In yet an additional embodiment, the length of the torrefaction chamber(s), which is surrounded by the outer jacket can comprise from about 10 to about 30 feet, preferably from about 15 to about 25 feet, more preferably from about 18 to 22 feet. In one preferred embodiment, the torrefaction chamber comprises schedule 40 pipe of any of the aforementioned dimensions.

According to certain alternative embodiments, the torrefaction device includes at least one torrefaction chamber comprising a closed conduit having a chamber inlet for receiving biomass and at least one chamber outlet. Preferably, the bottom of the conduit has a scalloped shaped bottom. That is the bottom of the torrefaction chamber includes one or more troughs configured such that a material handling device according to those described herein can be positioned within each trough. The material handling devices (e.g., auger) conveys the biomass from the chamber inlet to the chamber outlet. In one embodiment, the biomass is randomly and continuously churned in and out of each trough. Furthermore, the biomass can fly out of one trough and into a proximate trough while being conveyed through the torrefaction chamber.

Figure 5:
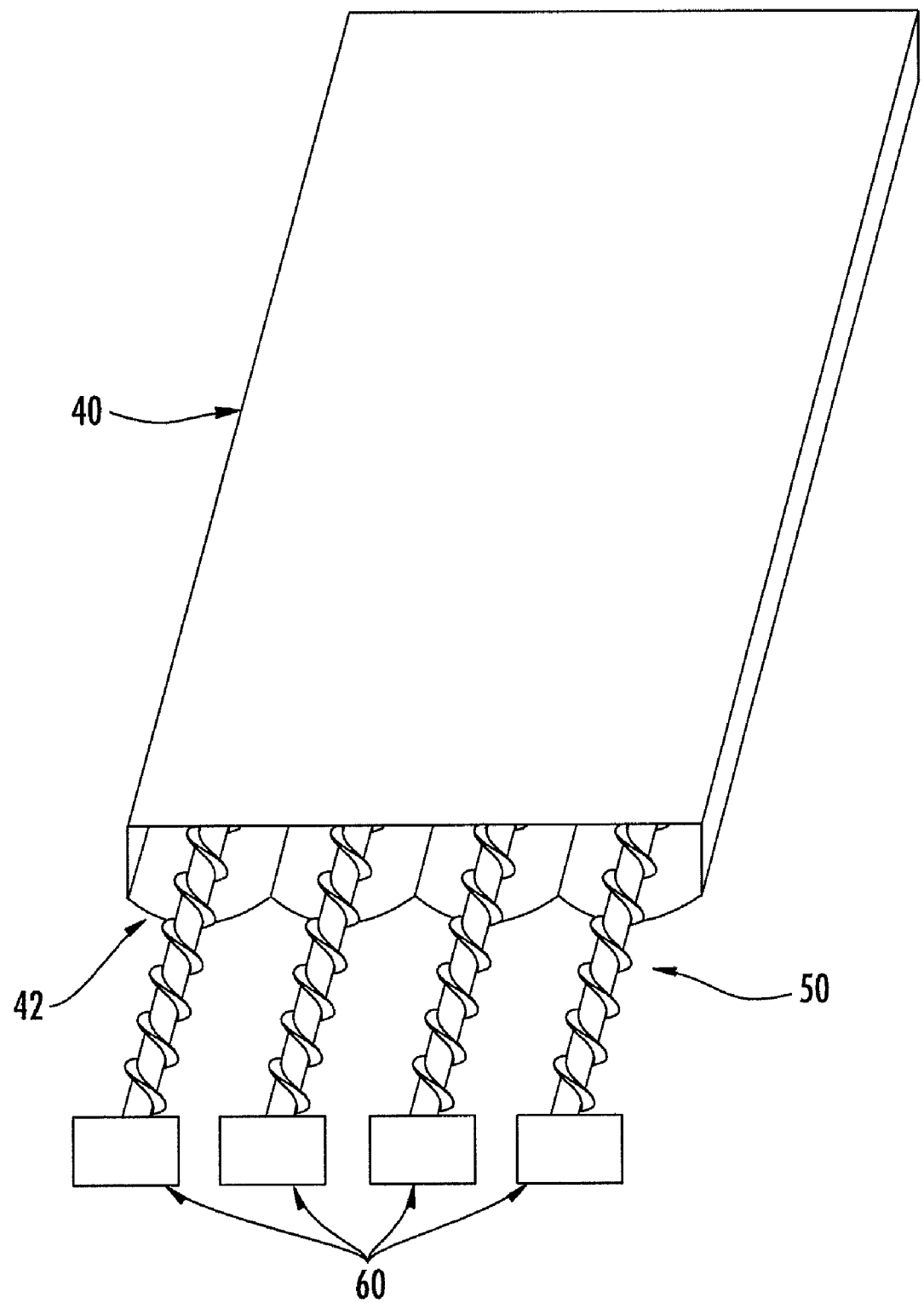
FIG. 5 depicts a torrefaction chamber according to one embodiment of the invention.

As shown in FIG. 5, the scalloped shaped torrefaction chamber 40 includes multiple troughs 42 in which biomass is conveyed through. In this embodiment, a material handling device 50 is provided to convey biomass through each trough 42. In one such embodiment the scalloped shaped chamber is substantially or completely surrounded by an outer jacket. The torrefaction gases and steam released within the torrefaction chamber travel into a burner unit and combusted. The flue gases and steam are then directed through the outer jacket to heat at least one of the outer walls of the torrefaction chamber. In another embodiment, only the bottom or scalloped shaped wall of the torrefaction chamber is jacketed. As such, the flue gases from the burner heat the bottom scalloped shaped wall. In such embodiments, the walls of the torrefaction chamber that are not jacketed (and thus not exposed to the flue gases for heating biomass) are preferably insulated to prevent the loss of heat through the unjacketed walls.

In another aspect of the present invention, a process for autothermal torrefaction of biomass is provided. In one embodiment, a process for autothermal torrefaction of biomass includes indirectly heating biomass through walls of a torrefaction chamber to a temperature sufficient to produce torrefied biomass. Biomass-derived gases, including steam, produced or released from within the torrefaction chamber are allowed or drawn into a burner unit and at least a portion of the combustible biomass-derived vapors are combusted. The combustion/flue-gas exits the burner and travels through a space located between and defined by the torrefaction chamber and an exterior housing defining a jacket that substantially surrounds the torrefaction chamber(s). The vapors exiting the burner provide the heat necessary for autothermal torrefaction of biomass within the torrefaction chamber. Beneficially, aside from fuel to pre-heat the device and a pilot light to ensure that the biomass derived gases ignite, all the heat energy used for torrefaction will come from the biomass itself.

According to one preferred embodiment, the process further includes pre-heating and/or pre-drying fresh biomass and metering the pre-heated biomass into the torrefaction chamber. Preferably, the fresh biomass is pre-heated and pre-dried by passing the biomass through a heat exchanger wherein combustion gases exiting the outer jacket provide heat energy to the fresh biomass. Although the heat exchanger can be either a direct or indirect exchanger, one preferred embodiment utilizes direct contact of the fresh biomass with the combusted gases. In such embodiments, the temperature of the biomass is not only elevated but a portion of the water content in the biomass can be reduced according to well known mass transfer principles. For instance, the direct contact between the fresh biomass, which can include a moisture content around 50% by weight, and the combusted gases can exploit the water concentration difference between the fresh biomass and the exiting combusted gases to help reduce the water content in the biomass prior to entering the torrefaction chamber.

According to certain embodiments, the biomass within the torrefaction chamber can be heated indirectly through the walls of the torrefaction chamber. In addition to the biomass itself, the air surrounding the biomass is also heated. In one embodiment, the gases surrounding the biomass in the torrefaction chamber is heated from about 300° C. to about 500° C. such that a portion of the biomass is pyrolyzed. Preferably, the portion of the biomass that undergoes prolysis includes mostly smaller pieces of the heterogeneous biomass. For example, smaller biomass pieces such as sawdust, wood chips, and leaves and bark can undergo pyrolysis. Upon undergoing pyrolysis, these smaller pieces of biomass produce a significant amount of heat, which helps heat the larger or bulkier pieces of biomass. In one embodiment, the biomass itself can be heated to about 265° C. to about 300° C., or about 265° C. to about 275° C. In yet another embodiment, the biomass itself can be heated to about 275° C. to about 300° C. In additional embodiments the gases and/or the biomass itself can be heated from about 300° C. to about 500° C., or about 300° C. to about 400° C., or 350° C. to about 450° C., 300° C. to about 500° C., or about 400° C. to about 500° C., or about 450° C. to about 500° C.

In one embodiment, the process for autothermal torrefaction of biomass comprises obtaining and maintaining a temperature difference between the torrefied biomass and/or torrefaction vapors at the discharge end of the torrefaction chamber and the vapors passing through the jacketed space comprises from about 280° C. to about 320° C., or from about 290° C. to about 310° C.; wherein the jacketed vapor temperature comprises the local temperature of the vapors (e.g., flue gases and steam) proximate to the discharge end of the torrefaction chamber or chambers. In one embodiment, the vapors passing through the jacketed space enter the jacketed space at a position proximate to the biomass discharge and comprise a temperature from about 290° C. to about 310° C. hotter than the biomass and/or vapors exiting the torrefaction chamber. In certain embodiments, the temperature difference can comprise from about 270° C. to 330° C.

In various embodiments, the process comprises monitoring the temperature of the vapors exiting the torrefaction device into the atmosphere and adjusting the operation of the device such that the temperature of the exiting vapors comprise from about 180° C. to about 220° C., or from about 190° C. to about 210° C. By maintaining an appropriate vapor exit temperature, processes according to embodiments of the present invention can minimize wasting heat that can be transferred to the biomass for torrefaction thereof.

The rate at which biomass can be charged into the torrefaction device can vary depending upon the particular embodiment being employed. However, embodiments of the present invention can operate with a feed rate of biomass from about 50 to about 5000 lbs/hr. In one embodiment, the device is adapted to accommodate a feed rate comprising from about 50 to about 500 lbs/hr, or about 60 to about 400 lbs/hr, or preferably from about 80 to about 300 lbs/hr, or more preferably from about 100 to about 200 lbs/hr. In other embodiments, the device is adapted to accommodate a feed rate of biomass comprising from about 1000 to about 5000 lbs/hr. In one embodiment, the feed rate can comprise from about 2000 to about 4000 lbs/hr, or about 2500 to about 3500 lbs/hr. In one alternative embodiment, the torrefaction device is adapted to accommodate a feed rate ranging from about 400 to about 1200 lbs/hr, or about 600 to about 1000 lbs/hr, or from about 700 to about 800 lbs/hr.

Torrefaction devices according to embodiments of the present invention can beneficially be transported to a point of operation having biomass for torrefaction. Such embodiments can be largely self-powered in that all heat energy, aside from start-up, for the torrefaction of biomass is derived from the processing of biomass through the torrefaction device. Possessing such field operability and mobility, these embodiments enable a reduction in transportation and processing costs of feedstocks. For instance, the cost of transporting the water in biomass is largely eliminated. In alternative embodiments, the torrefaction device can include or alternatively feed a pelletizer or briquetter while the torrefied biomass is hot to form pellets or briquettes with relatively small energy inputs and no additional binders. According to such embodiments, the autothermal torrefaction device can provide many if not all of the products previously described in the fields and forests with a technology that is mobile and/or modular. The proximity of this fuel production to its original feedstock source can reduce transportation costs and the overall use of carbon emitting fuels.

One embodiment of the present invention comprises methods for increasing the cost effectiveness of using torrefied biomass as a fuel. Such methods can include providing at least one autothermal torrefaction device as described herein at a point of operation being separate from a power plant for the torrefaction of biomass located at that point of operation. For example, the point of operation can include any point of harvest or source of biomass. As such, it should be understood that points of operation include the sites of harvest of woody and agricultural biomass. Non-limiting examples of such points of harvest include forests, fields and farms. These points of harvest can be several hundred miles (or more) away from an external heat source, such as an existing coal-fired power station. Further, the biomass located at the point of operation can be charged either continuously or batch-wise to the autothermal torrefaction device and converted into torrefied biomass as described herein.

In one preferred embodiment the autothermal torrefaction device is field operable. In particular, such embodiments can beneficially employ a mobile and/or modular unit that can be transferred by loading the autothermal torrefaction device onto the bed of a typical 17 ft utility truck or eighteen wheeler, for example only, and driven to separate location(s) for operation. In other words, the autothermal torrefaction device of the invention is preferably dimensioned such that vehicular transportation of the device is possible. As such, a single autothermal torrefaction device can beneficially be transported to several different locations for torrefaction of biomass independent of any existing power site or external heat source. Accordingly, the autothermal torrefaction device can be deployed to any point of operation(s) having biomass that can be torrified. As discussed previously, the torrefaction process drives off most to all of the moisture contained in the biomass and further renders the biomass hydrophobic in nature. Due to the reduction in moisture content, the cost of transporting the torrefied biomass is less than the cost of transporting unconverted biomass. Moreover, the hydrophobic nature of the torrefied biomass enables longer transportation and holding/storage times without undesirably picking up moisture. As such, the radius of operation for such embodiments from an external heat source, such as an existing coal firing station, is substantially without bounds. Additionally, since torrefied biomass is less likely to rot than untreated biomass, the torrefied biomass can be stored for greater periods of time prior to use. In various preferred embodiments, the biomass comprises cellulose based organic materials, while in other embodiments, the biomass comprises animal waste. Further, the autothermal torrefaction device according to various embodiments can also be used as a waste disposal or waste reduction unit to reduce the weight and volume of animal and plant waste products.

In one embodiment, biomass can be torrefied at a point of operation separate from an external heat source, such as an existing coal fired plant. For example, a mobile and/or modular torrefaction device according to embodiments of the present invention can be transported to a field or forest for the torrefaction of biomass located in the field or forest. However, this does not limit embodiments of the invention from being utilized at an existing power site if desired. In certain embodiments, the torrified biomass can be pelletized, briquetted, or otherwise densified by a mill connected to the torrefaction device or positioned proximately thereto, such as in the same field or forest. In one embodiment, the torrified biomass can be partially pelletized, briquetted, or otherwise densified in the field or forest and transported to a second location having a stand alone mill for final densification. In one embodiment, the torrefied biomass is transported to a second location, separate from the field or forest where the biomass was treated, for pelletization, briquetting, or the like. The second location can comprise a stand-alone milling operation or even a milling operation connected to an existing power plant. In one embodiment, the hot torrified biomass is allowed to cool prior to pelletization, briquetting, or the like at the same or different location as torrefaction.

In certain embodiments, the invention comprises a process for producing pellets or briquettes of torrefied biomass at a point of operation separate from external heat sources, power plants, stationary palletizing, briquetting, or other densification facilities, and the like. In one embodiment, the process comprises converting untreated biomass into torrefied biomass, as discussed throughout, at a point of harvest and palletizing, briquetting, or otherwise densifying the torrefied biomass at the same point of harvest. In preferred embodiments, the torrefied biomass is charged to at least one pellet mill while still being hot. For example, the temperature of the torrefied biomass charged to the densification mill can be from about 200° C. to about 320° C., or about 225° C. to about 300° C., or about 250° C. to 300° C., or preferably from about 270° C. to about 300° C.

Beneficially, embodiments of the present invention allow and include the pelletization of torrefied biomass in the field, farm, forest and the like. Thus, torrefied biomass can be quickly pelletized, briquetted, or otherwise densified at the point of harvest while the treated biomass is still hot from the torrefaction process. Consequently, pellets, briquettes, or the like of torrefied biomass can be achieved with relatively small energy inputs. Further, in various embodiments, no additional binders are required for forming pellets of torrefied biomass.

EXAMPLE

An autothermal torrefaction device according to one embodiment of the present invention was utilized for the torrefaction of pine logging residues (small diameter wood, bark, needles). The torrefaction device included 6 torrefaction chambers each having an overall length of 20 feet. The exterior housing or outer jacket surrounding the torrefaction chambers comprised a box having an internal width of 5 feet, an internal height of 5 feet and an internal length of 14 feet. As such, 14 feet of the 20 foot torrefaction chambers were surrounded by the outer jacket.

The biomass (i.e., the pine logging residues) was fed through a ½" screen on a hammermill. The water content varied from particle to particle but the overall average water content was approximately 50% by weight. The ground biomass was conveyed in a trough to a feed hopper. While being conveyed in the trough to the feed hopper, hot exhaust gases were blown across the biomass in the trough as well as around the outside of the trough. On average, this reduced the average water content of the biomass to about 45% by weight.

Prior to charging the biomass into the torrefaction chambers, the torrefaction device was heated by the combustion of propane in the burner. The combustion gases were passed through the open space between the jacket and the torrefaction chambers to provide the initial heat necessary for torrefying the biomass. After the torrefaction device was heated to an operating temperature of roughly 400° C. (typically anywhere from 300° C. to 450° C. is sufficient), the biomass was continually charged into the torrefaction chambers and conveyed through the chambers by means of an auger system to promote continuous turn-over of the biomass. The propane usage for initially heating the device and beginning the torrefaction process was about 671,000 BTU/hour. As the biomass was heated and began emitting torrefaction gases and steam, these vapors were combusted and passed through the jacketed space in a counter-current fashion to provide indirect heat for the torrefaction process.

Upon reaching autothermic conditions, as evident by the drastic reduction in propane usage, the feed rate averaged approximately 550 lbs/hour of biomass and 175 lbs/hour of torrefied material was produced. Under autothermic conditions, the propane usage was greatly reduced to about 20,000 BTU/hour, which accounts for roughly a 97% decrease in the rate at which propane is consumed. This level of propane usage correlates to the amount of propane used merely to ensure that the pilot light stays on. As such, in practical terms all the heat energy used for torrefaction came from the biomass itself.

During operation of the torrefaction device under autothermic conditions, the temperatures in the hottest section (i.e., the discharge end) of torrefaction chambers were monitored and the rate at which the biomass is conveyed through the device was modulated. More specifically, the residence time of the biomass in the torrefaction chambers was modulated such that as the discharge chamber temperatures rose above 450° C. the residence time in the torrefaction chambers was decreased by increasing the rate at which the biomass was conveyed. Further, as the discharge temperatures of the torrefaction chambers dipped below 400° C. the residence time in the torrefaction chambers was increased by reducing the rate at which biomass was conveyed through the chambers. Throughout the run under autothermic conditions, the average residence time in the torrefaction chambers ranged from approximately 5 to 7 minutes All torrefied material discharged from the torrefaction device was cooled from a temperature of about 400° C. to ambient temperatures with a combination of indirect cooling in a waterbath and air over steel and aluminum tubing.

The torrefaction chamber and outer jacket temperature recordings for this run are provided in Table 1. As indicated above, this particular torrefaction device included 6 torrefaction chambers. These chambers were positioned laterally across the width of the outer jacket. As such the chambers were numerically identified as Chambers 1-6. Chambers 1 and 6 were closest to the side wall of the outer jacket, while chambers 3 and 4 were positioned roughly equidistant from the center-point (e.g., 2.5 feet from the internal side walls) of the width of the outer jacket. Chamber 2 was positioned between chamber 1 and 3. Chamber 5 was positioned between chambers 4 and 6.

Under autothermic conditions, the temperature of chambers 1, 3, and 5 were each monitored at three different locations along the length of the jacketed chambers. In particular, the temperature of each chamber was monitored as follows: (1) near the discharge end (e.g., chamber 1—hot section); near the middle of the jacketed chamber (e.g., chamber 1—middle section); and near the inlet of the jacketed chamber (e.g., chamber 1—cool).

In addition to monitoring the chamber temperatures, the vapor temperature in the outer jacket was similarly monitored. More specifically, the vapors in the outer jacket were monitored at 6 different locations, with 3 measurements being taken along an upper section of the outer jacket and 3 along the lower section. These temperatures were monitored as follows: (1) near the inlet of the flue gas in the upper section of the jacket (e.g., jacket—upper hot); (2) near the inlet of the flue gas in the lower section of the jacket (e.g., jacket—lower hot; (3) near the middle (along the length of the box) upper section of the jacket (e.g., jacket—upper middle); (4) near the middle (along the length of the box) upper section of the jacket (e.g., jacket—lower middle); (5) near the outlet of the flue gas in the upper section of the jacket (e.g., jacket—upper cool); and (6) near the outlet of the flue gas in the lower section of the jacket (e.g., jacket—lower cool).

As shown in Table 1, a temperature gradient from the inlet end to the discharge end of each chamber is present. More importantly, however, the data in Table 1 demonstrates that torrefaction temperatures are obtained and maintained over several hours without the use of an external heat source. As such the heat for torrefaction is provided by the biomass itself. Accordingly, the torrefaction device provided an efficient means of torrefying the biomass at a greatly reduced residence time under autothermic conditions. Consequently, embodiments of the present invention provide a torrefaction device that torrefies biomass not only under autothermic conditions, but also provides increased throughput of biomass per unit time.

TABLE 1

Temperature Data During Autothermic Conditions

| TIME | Chamber 1 (cool section) Deg C. | Chamber 3 (cool section) Deg C. | Chamber 5 (cool section) Deg C. | Chamber 1 (middle section) Deg C. | Chamber 3 (middle section) Deg C. | Chamber 5 (middle section) Deg C. | Chamber 1 (hot section) Deg C. | Chamber 3 (hot section) Deg C. |
|---|---|---|---|---|---|---|---|---|
| 9:00 | 274 | 287.1 | 247.8 | 295.2 | 336.3 | 283.8 | 373.9 | 434.3 |
| 10:00 | 346 | 363.6 | 325.1 | 362 | 375.6 | 382 | 391.6 | 455 |
| 11:00 | 344.2 | 376.2 | 345.8 | 394.5 | 402.4 | 444.4 | 400.1 | 461.8 |
| 12:00 | 306 | 334.2 | 301.2 | 373.4 | 391 | 386.2 | 398.1 | 466.2 |
| 13:00 | 319.6 | 360.5 | 333.2 | 384.4 | 407.5 | 452.6 | 405.1 | 471.6 |
| 14:00 | 350.7 | 386.6 | 356.3 | 398.6 | 434.2 | 466.6 | 423.2 | 497.4 |
| 15:00 | 291 | 314.5 | 301.6 | 364.2 | 386.6 | 444.5 | 416 | 480 |

TABLE 1-continued

Temperature Data During Autothermic Conditions

| TIME | Chamber 5 (hot section) Deg C. | Jacket (upper - cool) Deg C. | Jacket (lower - cool) Deg C. | Jacket (upper - middle) Deg C. | Jacket (lower - middle) Deg C. | Jacket (upper - hot) Deg C. | Jacket (lower - hot) Deg C. |
|---|---|---|---|---|---|---|---|
| 9:00  | 424.8 | 464.4 | 410.5 | 492.8 | 453.3 | 524.3 | 506.9 |
| 10:00 | 450.2 | 488.9 | 448.7 | 512.5 | 485.8 | 540.1 | 525.9 |
| 11:00 | 455.5 | 497.3 | 457.9 | 522.5 | 494.9 | 541.4 | 531.1 |
| 12:00 | 452.8 | 482.8 | 441.7 | 509.6 | 486.7 | 537.9 | 526.1 |
| 13:00 | 462.1 | 496.8 | 451.8 | 520.4 | 495.2 | 550.3 | 533 |
| 14:00 | 484.8 | 530.4 | 485.6 | 554 | 529.6 | 590.3 | 571.4 |
| 15:00 | 484 | 502.9 | 458.7 | 539.8 | 507.6 | 581.6 | 557.9 |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An autothermal torrefaction device, comprising:
   (a) at least one torrefaction chamber, each chamber including a chamber inlet for receiving biomass and at least one chamber outlet;
   (b) an exterior housing defining an outer jacket substantially surrounding the at least one torrefaction chamber and including a jacket inlet and a jacket outlet, the outer jacket and the at least one torrefaction chamber define a space therebetween; and
   (c) a burner unit including an inlet operatively connected to the torrefaction chamber outlet and an outlet operatively connected to the jacket inlet;
   such that all vapors, including any steam and combustible gases derived from the biomass from within the at least one torrefaction chamber, travel directly into the burner unit for immediate combustion of all combustible gases derived from the biomass and subsequently travel through the space between the jacket and the at least one torrefaction chamber to provide heat necessary for autothermal torrefaction of biomass.

2. The autothermal torrefaction device of claim 1, wherein the flow of vapors produced or released from within the at least one torrefaction chamber travel in a first direction to the burner unit for combustion of at least a portion of the vapors and subsequently travel through the space between the jacket and the at least one torrefaction chamber in a second direction being opposite of the first direction.

3. The torrefaction device of claim 1, wherein the flow of vapors produced or released from within the at least one torrefaction chamber travel in the same direction as the vapors traveling through the space between the jacket and the at least one torrefaction chamber.

4. The autothermal torrefaction device of claim 1, further comprising a material handling device for transporting biomass from the chamber inlet to the chamber outlet.

5. The autothermal torrefaction device of claim 4, wherein the material handling device comprises a screw conveyer.

6. The autothermal torrefaction device of claim 1, wherein the device is mobile.

7. The autothermal torrefaction device of claim 1, wherein the at least one torrefaction chamber comprises a conduit.

8. The autothermal torrefaction device of claim 1, further comprising a direct or indirect heat exchanger located such that the vapors exiting the jacket outlet enter the heat exchanger and pre-heat fresh biomass before the biomass enters the torrefaction chamber.

9. The autothermal torrefaction device of claim 1, further comprising at least one pellet or briquette mill operatively connected to the chamber outlet such that torrefied biomass exiting the torrefaction chamber is palletized, briquetted, or otherwise densified.

10. A process for autothermal torrefaction of biomass, comprising:
    (a) indirectly heating biomass and air surrounding the biomass within at least one torrefaction chamber through walls of the at least one torrefaction chamber to a temperature sufficient to produce torrefied biomass;
    (b) allowing or drawing all vapors, including any steam and combustible gases derived from the biomass, from within the at least one torrefaction chamber into a burner unit;
    (c) immediately combusting all combustible gases derived from the biomass in the burner unit; and
    (d) passing the steam and combusted gases from step (c) through a jacketed space located between and defined by the at least one torrefaction chamber and an exterior housing substantially surrounding the at least one torrefaction chamber, wherein the vapors, including any steam and combustible gases derived from the biomass, provide heat necessary for autothermal torrefaction of biomass within the torrefaction chamber.

11. The process of claim 10, further comprises pre-heating biomass and metering the pre-heated biomass into the at least one torrefaction chamber, wherein the fresh biomass is pre-heated by either direct or indirect heat transfer from exhaust vapors exiting the jacketed space.

12. The process of claim 10, wherein indirectly heating the biomass and the gases surrounding the biomass comprises heating the gases to about 300° C. to about 500° C. such that a portion of the biomass is pyrolyzed.

13. The process of claim 12, wherein the biomass is heated to about 300° C. to about 400° C.

14. The process of claim 10, further comprising continually conveying biomass through the at least one torrefaction chamber such that the biomass is torrefied in no more than about 10 minutes.

15. The process of claim 10; wherein a temperature difference between the torrefied biomass at a discharge end of the at least one torrefaction chamber and the vapors passing through the jacketed space at a position proximate to the discharge end of the at least one torrefaction chamber comprises from about 280° C. to about 320° C.

16. The process of claim 15, wherein the vapors passing through the jacketed space enter the jacketed space at a temperature from about 290° C. to about 310° C. hotter than the biomass exiting the at least one torrefaction chamber.

17. The process of claim 10, wherein the process further comprises an initial heat providing step comprising the addition of heat to the device to raise the temperature of the device to an operating temperature and initiate torrefaction of the biomass at a first BTU/Hr rating and a second heat providing step during torrefaction of the biomass comprising the addition of heat to merely maintain ignition of a pilot light in the burner at a second BTU/Hr rating; said second BTU/Hr rating comprising from about 97% to about 92% less than said first BTU/Hr rating.

18. The process of claim 10, wherein the biomass has a residence time within the at least one torrefaction chamber comprising from about 2 to about 16 minutes.

19. The process of claim 10, wherein the biomass has a residence time within the at least one torrefaction chamber comprising from about 5 to about 10 minutes.

20. A method for increasing the cost effectiveness of using torrefied biomass as a fuel, comprising:
   (a) providing at least one autothermal torrefaction device according to claim 1 at a point of operation being separate from a power plant;
   (b) charging biomass located at the point of operation to the autothermal torrefaction device; and
   (c) converting the biomass located at the point of operation into torrefied biomass.

21. The method of claim 20, wherein the autothermal torrefaction device is mobile.

22. The method of claim 21, wherein the point of operation comprises a point of harvest having a source of biomass comprising a field, a farm, or a forest.

23. The method of claim 21, wherein the biomass comprises cellulose based organic material.

24. The method of claim 21, wherein the biomass comprises animal waste.

25. The method of claim 21, wherein the point of operation comprises more than one off-site field of operation including biomass for torrefaction.

26. The method of claim 21, further comprising at least partially pelletizing the torrefied biomass.

27. The method of claim 26, wherein the torrefied biomass is pelletized at the off-site field of operation.

28. The method of claim 27, wherein the torrefied biomass is partially pelletized at the off-site field of operation and transported to a second location for complete pelletization.

29. The method of claim 27, wherein the torrefied biomass is transported to a second location for pelletization.

30. A process for producing pellets of torrefied biomass, comprising:
   (a) converting untreated biomass into torrefied biomass by operation of a device according to claim 1 at a point of harvest; and
   (b) pelletizing the torrefied biomass at the same point of harvest.

31. The process of claim 30, wherein the pelletizing step comprises charging at least one pellet mill with torrefied biomass having a temperature ranging from about 250° C. to about 300° C.

* * * * *